United States Patent Office 2,702,295
Patented Feb. 15, 1955

2,702,295

COMBINED CHLORINATION AND RING CLOSURE OF BENZENE-THIOGLYCOLLIC ACIDS

Ernst Stoecklin, Binningen, and Peter Schobel, Basel, Switzerland, assignors to Ciba Limited, Basel, Switzerland, a Swiss firm No Drawing. Application March 19, 1951, Serial No. 216,458

Claims priority, application Switzerland March 24, 1950

6 Claims. (Cl. 260—330.5)

The present invention relates to thioindigoid vat dyestuffs. More particularly the present invention relates to a simplified method for preparing certain hydroxy thionaphthenes which are valuable intermediates for thioindigoid dyestuffs—asymmetrical or symmetrical—or for directly preparing symmetrical thioindigoid dyestuffs, if desired.

It has been found that a hydroxy thionaphthene can be prepared when 2:5-dimethyl-benzene-1-thioglycollic acid or 3:5-dimethyl-6-chlorobenzene-1-thioglycollic acid is subjected to the action of a chlorinating agent in a solvent which is inert to chlorosulfonic acid, and then, without separating an intermediate product, bringing about ring closure to the corresponding hydroxy thionaphthene by the addition of chlorosulfonic acid. Moreover, by suitable adjustment of reaction conditions, oxidation of the formed hydroxy thionaphthene to the corresponding symmetrical thioindigoid vat dyestuffs can be realized.

The chlorination of the thioglycollic acid must, according to the process of the present invention, be carried out in a solvent which is inert to chlorosulfonic acid. Illustrative of such solvents are for example tetrachlorethane, chloroform, carbon tetrachloride, nitrobenzene, trichlorobenzene, dichlorobenzene and dichlorethane. The chlorination is advantageously carried out with the aid of a chlorine carrier, such as antimony pentachloride or ferric chloride ($FeCl_3$). As chlorinating agent, use may advantageously be made of chlorine or sulfuryl chloride, and the chlorination may suitably be carried out at a temperature within the range from 30 to 100° C., for example at about 60° C.

Upon termination of the chlorination, the reaction mixture is directly subjected—without any separation of intermediate product—to the action of chlorosulfonic acid to achieve the desired ring closure to form the hydroxy-thionaphthene, according to the invention. The addition of the chlorosulfonic acid may be preceded by a cooling of the reaction mixture to a low temperature, for instance a temperature of 0° C. or even lower, and in this event the reaction goes only as far as the condensation to the hydroxy thionaphthene provided the reaction temperature is not substantially above 0° C. If it is desired that the reaction should proceed to the formation of the symmetrical thioindigoid vat dyestuff, then the reaction is carried out at somewhat higher temperatures, for example at about 30°, whereby the hydroxy thionaphthene first formed is oxidized by means of the chlorosulfonic acid. The upper limit of the temperature is not critical but at temperatures substantially above 50° C., there is some danger of undesired by-reaction.

According to a special embodiment of the process, the initial thioglycollic acid—which may itself be prepared in known manner by the condensation of the corresponding thiophenol with halogen acetic acid, particularly chloracetic acid, in aqueous medium—may be used directly in the water-wet state, for example in the form of a moist filter cake or paste. In this event, the water-containing thioglycollic acid is dispersed or dissolved in the aforesaid solvent, prior to the chlorination. At this stage, so much water generally separates that the major portion thereof can be removed by mechanical means, as by decanting. This results in a simplification and shortening of the distillation step which is necessary for the complete removal of the water and which is preferably carried out at reduced pressure, for example at ⅓ to 1/10 atmosphere. In this connection, last traces of water are eliminated by warming the solution. If desired, the solvent—which may have distilled over in appreciable amount—may be replaced prior to the chlorinating operation.

The invention is of particular importance because it makes possible the production, in a very simple manner, of hydroxythionaphthenes which may be used in known manner for producing indigoid dyestuffs e. g. by condensation with isatin chlorides, anils of thionaphthenequinones, etc. They may also be readily converted into symmetrical thioindigoid dyestuffs. Thus, as afore-indicated, it is possible—by cooling the reaction mixture resulting from the aforesaid chlorination to a temperature of about 30° C. instead of to the lower temperature of the order of 0° C., prior to treatment with the chlorosulfonic acid—to end up with the symmetrical thioindigo dyestuff corresponding to the thionaphthene which is produced at the lower temperature.

The following examples illustrate the invention without however being intended to limit the same. Parts and percentages are by weight, and the temperatures are in degrees centigrade.

Example 1

196 parts of 2:5-dimethylbenzene-1-thioglycollic acid are dissolved in 1000 parts of tetrachlorethane. 1 part of antimony pentachloride and 142 parts of sulfuryl chloride are added to this solution and the whole is heated and kept at 60° for 1 hour. A vigorous stream of hydrogen chloride and sulfur dioxide gas is evolved during this operation, and the 2:5-dimethylbenzene-1-thioglycollic acid is chlorinated to 2:5-dimethyl-4-chlorobenzene-1-thioglycollic acid.

The thus-obtained solution is cooled down to about —5° and, at this temperature, 1000 parts of chlorosulfonic acid are introduced slowly, without allowing the reaction temperature to rise above 0°. After several hours, the reaction mass is poured out onto a large quantity of ice and water. The tetrachlorethane is removed by steam distillation, and the obtained 4:7-dimethyl-5-chloro-3-hydroxythionaphthene is filtered off and washed with water until it is acid-free.

It corresponds to the formula

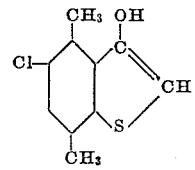

Instead of tetrachlorethane chloroform, carbon tetrachloride, nitrobenzene, trichlorobenzene, dichlorobenzene or dichlorethane may be used in the same manner.

If 230 parts of 3:5-dimethyl-6-chloro-benzene-1-thioglycollic acid are used instead of 196 parts of 2:5-dimethylbenzene-1-thioglycollic acid, 4:6-dimethyl-5:7-dichloro-3-hydroxy thionaphthene is obtained which corresponds to the formula

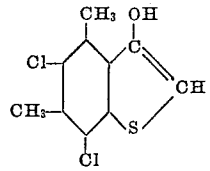

Example 2

A water-wet filter cake with a content of 196 parts of 2:5-dimethylbenzene-1-thioglycollic acid is dissolved in 1000 parts of tetrachlorethane, whereupon the major portion of the water separates out of the tetrachlorethane solution. After removal of most of this waterlayer mechanically, the remaining water is distilled off at about 45° to 50° with some tetrachlorethane in a proportion of about 3:1 at about 100 mm. pressure and while stirring. Thereafter, the solvent is replaced to constitute the original 1000 parts. 1 part of antimony pentachloride and 142 parts of sulfuryl chloride are then added, and the solution is kept at 60° for 1 hour. A vigorous stream of hydrogen chloride and sulfur dioxide gas is evolved during this operation, and the 2:5-dimethylbenzene-1-thioglycollic acid is chlorinated to 2:5-dimethyl-4-chlorobenzene-1-thioglycollic acid.

The thus-obtained solution is cooled down to about −5° and, at this temperature, 1000 parts of chlorosulfonic acid are introduced slowly, without allowing the reaction temperature to rise above 0°. After several hours, the reaction mass is poured out onto a large quantity of ice and water. The tetrachlorethane is removed by steam distillation, and the obtained 4:7-dimethyl-5-chloro-3-hydroxythionaphthene is filtered off and washed with water until it is acid-free.

*Example 3*

An aqueous paste obtained by filtration and containing 230 parts of 3:5-dimethyl-6-chlorobenzene-1-thioglycollic acid is stirred into 1000 parts of tetrachlorethane, whereupon the major portion of water separates out of the tetrachlorethane solution. After decantation of most of this waterlayer, the remaining water is distilled off at about 45° to 50° with some tetrachlorethane in a proportion of about 3:1 at about 100 mm. pressure and while stirring. Thereafter, the solvent is replaced to constitute the original 1000 parts. 1 part of antimony pentachloride and 142 parts of sulfuryl chloride are then added, and the solution is kept at 60° for 1 hour. A vigorous stream of hydrogen chloride and sulfur dioxide gas is evolved during this operation, and the 3:5-dimethyl-6-chlorobenzene-1-thioglycollic acid is chlorinated to 3:5-dimethyl-4:6-dichlorobenzene-1-thioglycollic acid.

The thus-obtained solution is cooled down to about −5° and, at this temperature, 1000 parts of chlorosulfonic acid are introduced slowly, without allowing the reaction temperature to rise above 0°. After several hours, the reaction mass is poured out onto a large quantity of ice and water. The tetrachlorethane is removed by steam distillation, and the obtained 4:6-dimethyl-5:7-dichloro-3-hydroxy thionaphthene is filtered off and washed with water until it is acid-free.

*Example 4*

The solution of 2:5-dimethyl-4-chlorobenzene-1-thioglycollic acid obtained according to the first paragraph of Example 1 or Example 2, is cooled to about 30°. 1000 parts of chlorosulfonic acid are added in the course of 1 to 2 hours, whereupon 4:7-dimethyl-5-chloro-3-hydroxythionaphthene is formed, which soon undergoes oxidation to 4:4′, 7:7′-tetramethyl-5:5′-dichloro-thioindigo, as is indicated by a deep green coloration. Upon termination of the dyestuff formation, the reaction mass is poured out onto ice water, the solvent tetrachlorethane distilled off with steam, and the dyestuff filtered off and washed free of acid.

What is claimed is:

1. In a process involving the ring-closure of a benzene thioglycollic acid to form a hydroxy thionaphthene, the simplification which consists in chlorinating a member of the group consisting of 2:5-dimethylbenzene-1-thioglycollic acid and 3:5-dimethyl-6-chlorobenzene-1-thioglycollic acid in an indifferent solvent by means of sulfuryl chloride until one chlorine atom has entered the 4-position of the benzene nucleus and adding chlorosulfonic acid to the solution of the chlorinated thioglycollic acid thus obtained to effect the said ring-closure.

2. In a process involving the ring-closure of a benzene thioglycollic acid to form a hydroxy thionaphthene, the simplification which consists in chlorinating 2:5-dimethylbenzene-1-thioglycollic acid in an indifferent solvent by means of sulfuryl chloride until one chlorine atom has entered the 4-position of the benzene nucleus and adding chlorosulfonic acid to the solution of the chlorinated thioglycollic acid thus obtained to effect the said ring-closure.

3. In a process involving the ring-closure of a benzene thioglycollic acid to form a hydroxy thionaphthene, the simplification which consists in chlorinating 3:5-dimethyl-6-chlorobenzene-1-thioglycollic acid in an indifferent solvent by means of sulfuryl chloride until one chlorine atom has entered the 4-position of the benzene nucleus and adding chlorosulfonic acid to the solution of the chlorinated thioglycollic acid thus obtained to effect the said ring-closure.

4. In a process involving the ring-closure of a benzene thioglycollic acid to form a hydroxy thionaphthene, the simplification which consists in removing water by mechanical means and by means of distillation under reduced pressure from a mixture of an aqueous paste of a member of the group consisting of 2:5-dimethylbenzene-1-thioglycollic acid and 3:5-dimethyl-6-chlorobenzene-1-thioglycollic acid and an indifferent solvent immiscible with water, adding sulfuryl chloride and a chlorine carrier to the anhydrous solution of the thioglycollic acid thus obtained, effecting the chlorination until one chlorine atom has entered the 4-position of the benzene nucleus, and adding chlorosulfonic acid to effect the said ring-closure.

5. In a process involving the ring-closure of a benzene thioglycollic acid to form a hydroxy thionaphthene, the simplification which consists in removing water by mechanical means and by means of distillation under reduced pressure from a mixture of an aqueous paste of 2:5-dimethylbenzene-1-thioglycollic acid and an indifferent solvent immiscible with water, adding sulfuryl chloride and a chlorine carrier to the anhydrous solution of the thioglycollic acid thus obtained, effecting the chlorination until one chlorine atom has entered the 4-position of the benzene nucleus, and adding chlorosulfonic acid to effect the said ring-closure.

6. In a process involving the ring-closure of a benzene thioglycollic acid to form a hydroxy thionaphthene, the simplification which consists in removing water by mechanical means and by means of distillation under reduced pressure from a mixture of an aqueous paste of 3:5-dimethyl-6-chlorobenzene-1-thioglycollic acid and an indifferent solvent immiscible with water, adding sulfuryl chloride and a chlorine carrier to the anhydrous solution of the thioglycollic acid thus obtained, effecting the chlorination until one chlorine atom has entered the 4-position of the benzene nucleus, and adding chlorosulfonic acid to effect the said ring-closure.

References Cited in the file of this patent

UNITED STATES PATENTS

| Number | Name | Date |
|---|---|---|
| 899,152 | Bauer | Sept. 22, 1908 |
| 2,017,613 | Veraguth | Oct. 15, 1935 |
| 2,129,014 | Lodge et al. | Sept. 6, 1938 |
| 2,158,032 | Lubs et al. | May 9, 1939 |